United States Patent [19]

Mathur et al.

[11] Patent Number: 5,147,516
[45] Date of Patent: Sep. 15, 1992

[54] NOX REDUCTION BY SULFUR TOLERANT CORONAL-CATALYTIC APPARATUS AND METHOD

[75] Inventors: Virendra K. Mathur, Durham; Ronald W. Breault, Kingston; Christopher R. McLarnon, Exeter, all of N.H.; Frank G. Medros, Waltham, Mass.

[73] Assignee: Tecogen, Inc., Waltham, Mass.

[21] Appl. No.: 555,561

[22] Filed: Jul. 19, 1990

[51] Int. Cl.$^5$ .................. C01B 21/00; C01B 21/30
[52] U.S. Cl. .................. 204/177; 204/178; 204/179
[58] Field of Search .................. 204/177, 178, 179; 60/275, 274, 273; 422/186.04, 186.21

[56] References Cited

U.S. PATENT DOCUMENTS

| 2,573,967 | 11/1951 | Hamlin | 204/184 |
| 3,562,127 | 2/1971 | Wooton et al. | 204/177 |
| 3,983,021 | 9/1976 | Henis | 204/164 |
| 4,253,925 | 3/1981 | Mason | 204/129 |

OTHER PUBLICATIONS

K. S. Visvanathan, *Journal of the Indian Chemical Society;* "The Decomposition of Nitric Oxide in the Silent Electric Discharge"; 29:307–16 (1952).
K. S. Visvanathan, *Journal of the Indian Chemical Society;* "The Decomposition of Nitric Oxide in the Silent Electric Discharge"; 30:836–40 (1953).
Joshi, Shridhar S.; *Transactions of the Faraday Society;* "The Decomposition of Nitric Oxide in the Silent Electric Discharge"; 23:227–38 (1927).
Joshi, Shriidhar S.; *Transactions of the Faraday Society;* "The Decomposition of Nitric Oxide in the Silent Electric Discharge"; 25:108–17 (1929).
Joshi, Shridhar S.; *Transactions of the Faraday Society;* "The Decompositionof Nitric Oxide in the Silent Electric Discharge The Variation of the Current and of the Power during the Reaction"; 25:118–28 (1929).
Joshi, Shridhar S.; *Transactions of the Faraday Society;* "The Decomposition of Nitric Oxide in the Silent Electric Discharge, Influence of the Addition of Foreign Gases" 25:137–47 (1929).
Brewer, A. Keith and Westhaver, J. W., *Journal of Physical Chemistry;* "The Synthesis of Ammonia in the Flow Discharge", 33:883 89 (1929).

Primary Examiner—John F. Niebling
Assistant Examiner—Steven P. Marquis
Attorney, Agent, or Firm—Lorusso & Loud

[57] ABSTRACT

This invention presents an $NO_x$ environment effective reduction apparatus comprising a sulfur tolerant coronal-catalyst such as high dielectric coronal-catalysts like glass wool, ceramic-glass wool or zirconium glass wool and method of use. In one embodiment the invention comprises an $NO_x$ reduction apparatus of sulfur tolerant coronal-catalyst adapted and configured for hypercritical presentation to an $NO_x$ bearing gas stream at a minimum of at least about 75 watts/cubic meter.

11 Claims, 5 Drawing Sheets

NOX REDUCTION BY SULFUR TOLERANT CORONAL-CATALYTIC APPARATUS AND METHOD

STATEMENT OF GOVERNMENTAL INTEREST

The U.S. Government has a paid-up license in this invention and the right in limited circumstances to require the patent owner to license others on reasonable terms as provided in the terms of contract No. DE-AC22-87PC79852 awarded by the U.S. Department of Energy.

FIELD OF THE INVENTION

This invention presents an $NO_x$ environment effective reduction apparatus comprising a sulfur tolerant coronal-catalyst such as high dielectric coronal-catalysts like glass wool, ceramic-glass wool or zirconium glass wool and method of use. In one embodiment the invention comprises an $NO_x$ reduction apparatus of sulfur tolerant coronal-catalyst adapted and configured for hypercritical presentation to an $NO_x$ bearing gas stream at a minimum of at least about 75 watts/cubic meter.

BACKGROUND OF THE INVENTION

Millions of tons of nitrogen oxides, (denoted, generally herein as "$NO_x$"), are emitted into the atmosphere each year as a result of high temperature combustion of fossil fuels. Nitrogen oxides have been cited as major contributors to acid rain, by some estimates being about one-third of the acid contribution. Thus global interest has been focused on development of practical apparatus and methods to reduce the entry of nitrogen oxides int the atmosphere.

Since the first part of this century, developmental efforts have been directed to convert nitrogen oxides to the individual elemental diatoms, $N_2$ and $O_2$. Yet despite the lengthy search, no previous investigator has succeeded in devising a large scale procedure that does not require introduction of an exogenous reducing agent such as $NH_3$, $CH_4$, or CO. Alternatively, the use of electron beam (e-beam) irradiation, electrical discharge irradiation, and light (laser or flash) has been unsuccessfully attempted.

Previous investigation on chemical reactions in electrical discharge includes the work of Joshi in the 1920s ($NO_2$ and $N_2O$ decomposition/electron movement between glass walls in AC discharge), Visvanathan in the 1950s (NO decomposition in electric charge). Others looking at the general conditions of electric/chemical reactions include Brewer and Westhaver (*J. of Phys. Chem.;* 33:883 (1929)), Lacoste, G. and Bess, R (*Rev. Chim. Minerale;* 11:14 (1974)), Bess, R. (*Rev. Phys. Appl.;* 12:1029 (1977)). A more comprehensive presentation of the previous work in nitrogen oxide control is presented in *A Unified Projection of the Performance and Economics of Radiation-Initiated $NO_x$/$SO_x$ Emission Control Technologies,* Person et al. Dept. of Energy Cpontract No. DE-AC22-84PC70259 (1985), the teachings of which are incorporated herein by reference.

Other works on electro-catalysts take a position directly opposite from the instant invention. Such are those of van den Bleek, et al., (*I. Chem. E. Symposium Series,* U. of Salford (1979)) stating that efficiency of nitrogen oxide reduction is improved when catalytic surfaces are able to donate an electron to the oxide, and Wooten and Mangold (U.S. Pat. No. 3,562,127 (1971)) (using gold plated, i.e. conductive, metal wool) and reporting augmented nitrogen reduction only when gold is used.

The instant inventive apparatus and method overcomes the problems previously encountered in the art. This invention employs a novel concept based on recognizing chemical reactions occurring in gaseous electrical discharge as distinct from reactions that result when equally energetic electrons are made to travel on metal surfaces.

SUMMARY OF THE INVENTION

This invention concerns an $NO_x$ environment effective reduction apparatus comprising a sulfur tolerant coronal-catalyst. In one embodiment the coronal-catalyst is a high dielectric catalyst, such as glass wool or ceramic-glass wool. A useful high dielectric material is strontium titanate. In a particular embodiment the coronal-catalyst is $TiO_2$ (such as Rutile) in filamentous form. In a specific embodiment the coronal-catalyst is charged at from at least about 75 watts/meter$^3$.

Filamentous form (particularly bulk fibers about 1/16 inch in length) high dielectric catalysts comprises titanate (such as barium, calcium or zinc titanate), alumina, zirconia (such as $ZrO_2$) or magnesia.

In another embodiment this invention includes an $NO_x$ environment effective reducion apparatus comprising a sulfur tolerant coronal-catalyst wherein said coronal-catalyst is adapted and configured for hypercritical presentation to an $NO_x$ bearing gas stream at least about 75 watts/meter$^3$. In a particular embodiment the coronal-catalyst is a high dielectric catalyst, such as glass wool or ceramic-glass wool.

One specific embodiment of the invention is an $NO_x$ environment effective reduction apparatus comprising a sulfur tolerant coronal-catalyst of glass wool or ceramic-glass wool;

said coronal-catalyst maintainable at at least about 75 watts/meter$^3$;

coronal-catalyst is disposed in from one to a plurality of tubular members configured and adapted to receive a flow of $NO_x$ bearing gas;

said coronal-catalyst being present in amounts of from about 0.5 to about 150 kg/m$^3$;

said apparatus activatable by voltage from about 4000 to about 30,000 volts;

said voltage having a frequency of from 60 Hz to about 30,000 Hz;

said flow of $NO_x$ bearing gas having a residence time in said tubular members of from about 0.2 to about 5 seconds or more. The useful voltages may have wave form of sine, square, triangle or pulse.

The invention further comprises a method of environment effective reducing of $NO_x$ emission comprising the step of exposing $NO_x$ to a sulfur tolerant coronal-catalyst at least about 75 watts/meter$^3$. In embodiments of the method the coronal-catalyst is a high dielectric catalyst, such as glass wool or ceramic-glass wool.

One specific embodiment is a method of environment effective reducing of $NO_x$ emission comprising the step of exposing $NO_x$ to a sulfur tolerant coronal-catalyst wherein said coronal-catalyst is adapted and configured for hypercritical presentation to an $No_x$ bearing gas stream at a minimum of at least about 75 watts/meter$^3$, optionally wherein the coronal-catalyst is a high dielectric catalyst, such as glass wool or ceramic-glass wool. This method, in one embodiment, comprises an $NO_x$ environment effective reduction apparatus comprising a sulfur tolerant coronal-catalyst of glass wool or ceramic-glass wool;

disposing said coronal-catalyst in from one to a plurality of tubular members configured and adapted to receive a flow of $NO_x$ bearing gas;

maintaining said coronal-catalyst at at least about 75 watts/meter$^3$;

said coronal-catalyst being present in amounts of from about 0.5 to about 150 kg/m$^3$;

applying voltage to said apparatus activatable by voltage from about 4000 to about 30,000 volts;

said voltage having a frequency of from 60 Hz to about 30,000 Hz;

maintaining residency of said flow of $NO_x$ bearing gas in said tubular members of from about 0.2 to about 5 seconds or more. The useful voltages may have wave form of sine, square, triangle or pulse. Alternating voltage is a useful embodiment.

BRIEF DESCRIPTION OF THE DRAWINGS

FIGS. 5(a)-(d) show a reaction scheme.

DETAILED DESCRIPTION OF THE INVENTION

The instant invention is most clearly understood with reference to the following definitions.

"Sulfur tolerant" shall mean not more that about 10% reduction in efficiency under conditions of either (i) 40 ppm sulfur/gm of catalyst, or (ii) a molar ratio of NO to $SO_2$ equal to or less than about 1.

"High Dielectric" refers to a dielectric constant approximately of glass wool and ceramic-glass wool—about 4—up to $TiO_2$ or $ZrO_2$ of 80 or beyond.

Figure 5:
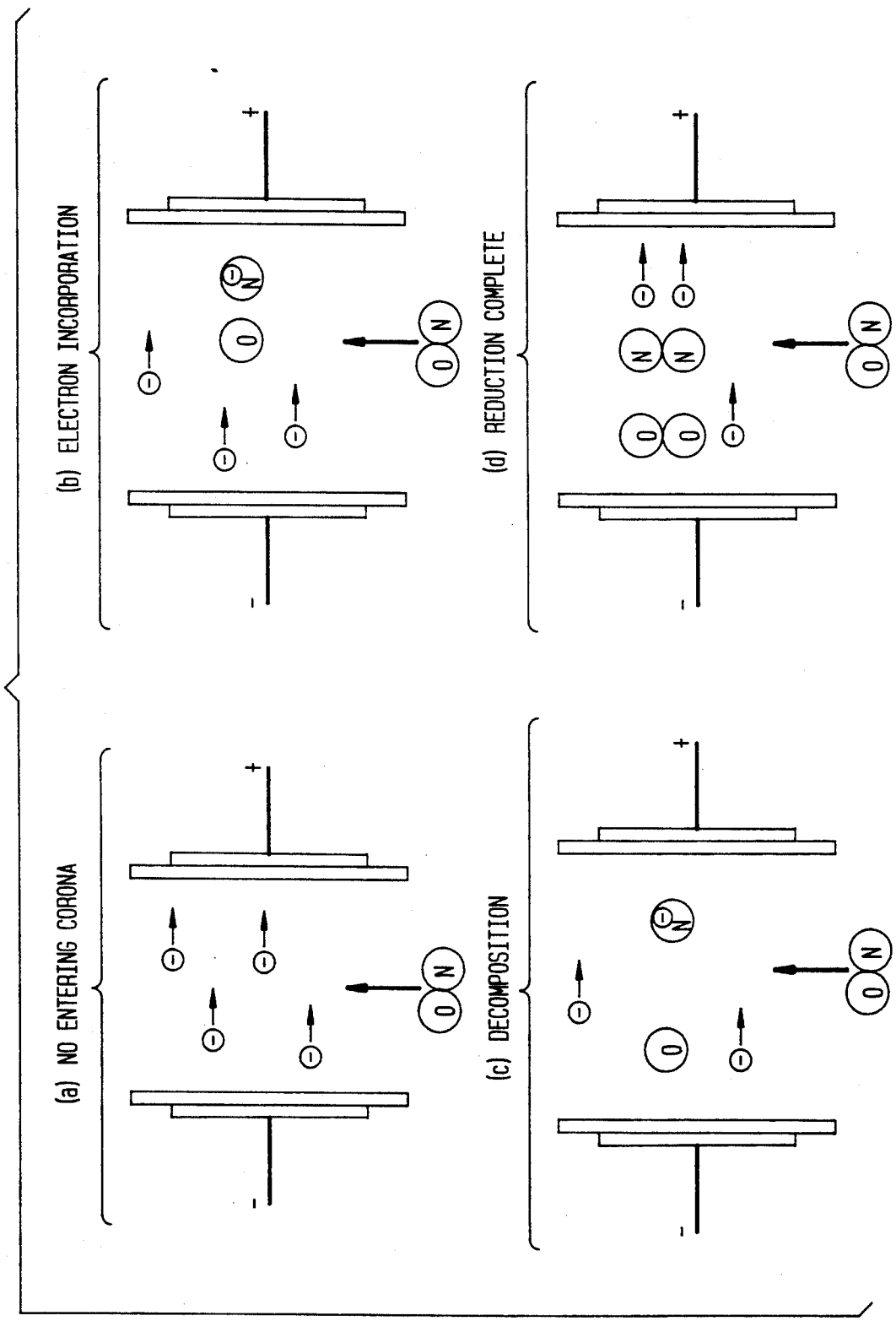
FIG. 5 is a schematic representation of coronal-catalyst reaction.

"Coronal-catalyst" shall mean those catalysts which are not substantially surface area dependent as to catalytic activity. A particular coronal-catalyst is material such as glass wool, filamentous in nature, which disperses electron charge and channels the flow of electrons through a gas thereby enhancing electron density in the flow path. Thus, such charge dispersion and electron channeling augments electron-molecule collision as compared to molecular-molecular collision. This is represented in FIG. 5. Electron flow channeled and at high velocity and density across coronal-catalyst surface is seen to increase likelihood of an $NO_x$ reduction producing collision.

"Environment effective" shall mean reduction of $NO_x$ by at least about 90% and preferably by about 98% and more preferably about 99.4%.

Kaowool is a trademark of Thermal Ceramics, Inc. (Augusta, Ga.) for ceramic glass fibers and is generically referred to herein as ceramic-glass wool.

$NO_x$ shall mean any oxide of nitrogen, including but not limited to NO, $N_2O$, $NO_2$, $N_2O_5$, $N_2O_3$, $NO_3$.

"Hypercritical presentation" to an $NO_x$ bearing gas stream shall mean at a minimum of at least about 75 w/m$^3$. Presentation parameters providing hypercritical presentation include:

1. Operation from about 60° F. to about 1000° F. Preheating is not required.
2. Water vapor present in the reaction area up to about 12%.
3. $SO_2$ concentration up to about 3000 ppm.
4. Oxygen up to about 5%.
5. Voltage from about 4000 to about 30,000 volts. In particular it is observed that rate of change in voltage going from about zero to a level up to maximum augments efficiency. In various applications known wave forms such as sine, square, triangle and pulse as well as others are useful.
6. Column packing from about 0.5 to about 150 kg/m$^3$.
7. Column residence time from about 0.2 to about 5 seconds or more. Residence time is directly related to column flow and column length.
8. CO concentration up to about 1000 ppm. CO increases $NO_x$ reduction as shown in FIG. 6.
9. Frequency of from 60 Hz to about 30,000 Hz.

Hypercritical reaction conditions are easily determined empirically. If $NO_x$ is not being effectively removed, removal is increased by increasing voltage, increasing column packing, increasing residence time, increasing temperature, increasing the frequency, decreasing $O_2$, decreasing $SO_2$, decreasing but not eliminating CO, or decreasing $H_2O$. In instances of a slight excess of oxygen, addition of a reducing gas such as CO will effectively reduce the adverse consequence of the oxygen excess. Hypercritical presentation also recognizes that there is a threshold voltage below which no substantial $NO_x$ reduction will occur. Upon reaching the threshold voltage some variability in reduction is observed during an equilibration or ignition phase of the reduction reaction.

$$\text{"\% NO Conversion" shall mean} \frac{(NO_{in} - NO_{out})}{NO_{in}} \times 100$$

$$\text{"\% NOx Reduction" shall mean} \frac{(NOx_{in} - NOx_{out})}{NOx_{in}} \times 100$$

as to mole basis of N, alone.

Without being bound by any particular theory, it is believed that the coronal-catalytic reduction phenomenon is based on energy input of corona catalyzed reactions. A corona is an energetic electric field in which there is a cool discharge promoting the free flow of electrons through the inter-electrode spaces. It is important to distinguish the cool discharge herein employed from hot discharge. Cool discharge is distinguished in (1) only the electrons gain appreciable energy through the system and therefor increased temperature, leaving the bulk of material flowing through the system largely substantially unheated and thus exiting at the approximate entry temperature, and (2) a corona is generally an evenly distributed discharge over the entire reactor volume, where as a hot discharge is typically a local point to point arc engaging very little volume.

FIG. 5. depicts the hypothetical steps of coronal catalyzed reaction. In FIG. 5(a) the active corona is shown as free electrons flowing between the negative and positive electrodes. The oxide of nitrogen used in this example is nitric oxide (NO), but other oxides of nitrogen are similarly reacted. As the nitric oxide (NO) flows through the reactor it is bombarded by the free flowing electrons. Most of the electrons have insufficient energy to be incorporated into the nitric oxide electron orbitals. However, some electron collisions are sufficiently energetic for electron incorporation as shown in 5(b). The unstable anionic nitric oxide molecule decomposes into a negatively charged nitrogen radical and an oxygen atom as shown in 5(c). Finally the nitrogen and oxygen atoms react through other short lived intermediate reactions forming molecular nitrogen and oxygen as in 5(d).

Figure 1:
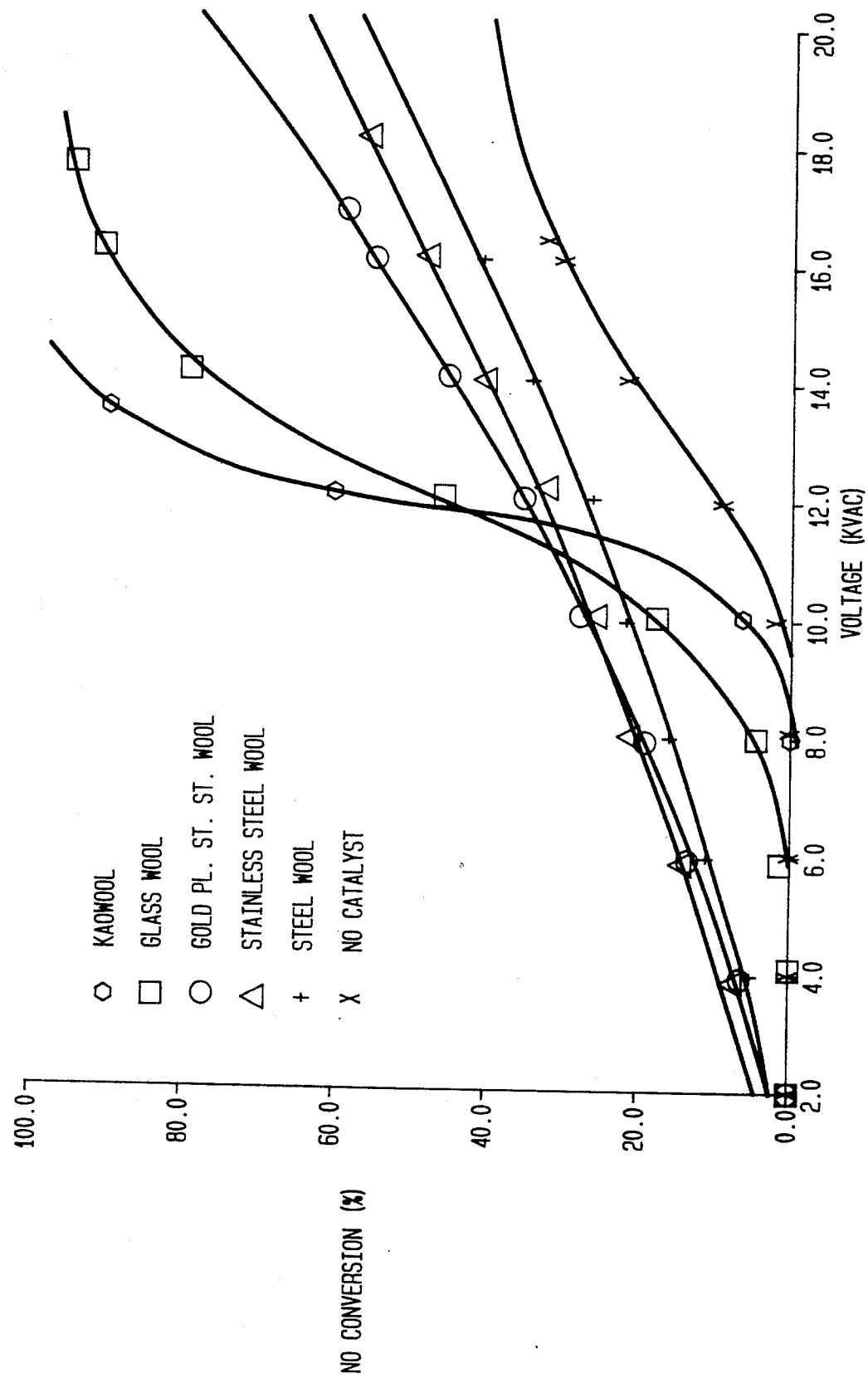
FIG. 1 is a graphic representation of the surprising superiority of the coronal-catalysts of the present invention as compared to non coronal-catalyst column packing materials.

FIG. 1 shows the surprising superiority of ceramic-glass wool and glass wool to conductive wools in reducing nitrogen oxides under electrical discharge conditions. Glass wool is available from a number of sources including Fisher Scientific Company (Pittsburgh, Pa.) and Supelco, Inc. (Belle Fonte, Pa.). Examples of inferior materials shown in FIG. 1 are gold plated stainless steel stainless steel wool and steel wool none of which achieved grater than 80% conversion of nitrogen oxides compared to substantially 100 percent conversion for ceramic-glass wool and glass wool when presented with up to about 700 ppm NO or more. The reaction conditions resulting in the data of FIG. 1 in which test gases were passed over packing materials in a column were as follows:

NO concentration at inlet=490 to 500 ppm
$N_2$ balance to make 100%
Voltage across electrodes=0-18.0 KVAC
Residence time of gas in column=2.0 to 2.1 sec
Temperature of gas and column=30° C.

Figure 2:
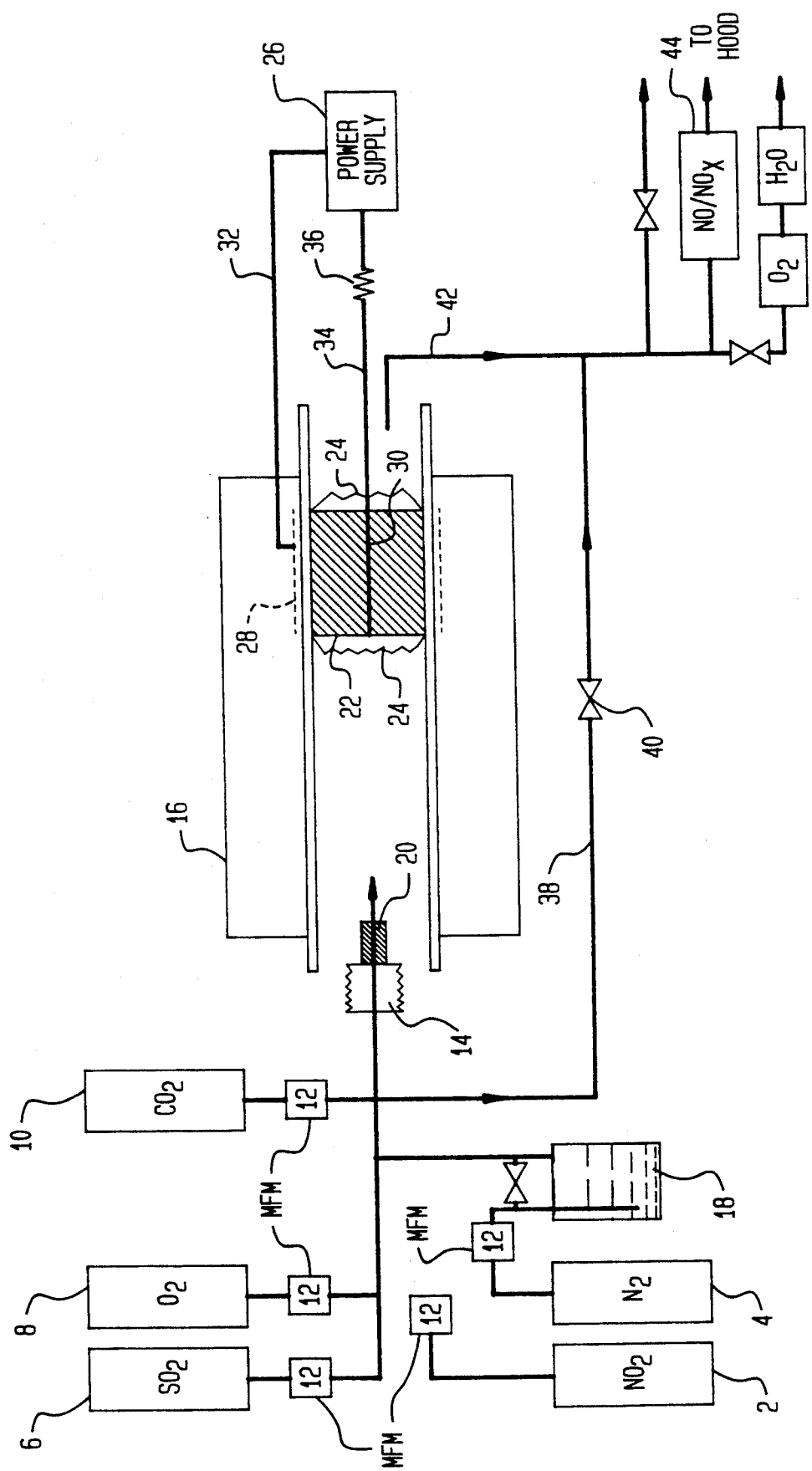
FIG. 2 is a schematic diagram of an experimental apparatus.

A test apparatus for determining $NO_x$ removal is schematically represented in FIG. 2. Gas cylinders supply metered amounts of gas to a test column, the gas and amount supplied depending on experimental protocol. Gas cylinder 2 supplies nitric oxide, gas cylinder 4 supplies nitrogen, gas cylinder 6 supplies sulfur dioxide, gas cylinder 8 supplies oxygen, and gas cylinder 10 supplies carbon dioxide. All gas cylinders were metered by calibrated mass flow meters 12. The gaseous mixture from the cylinders is passed through a preheat section 14 prior to entering the furnace 16. Provision was made to humidify nitrogen gas prior to furnace entry by passage through a humidifying means 18, here a bubbling device. Inlet of gas to the furnace was through a 1 inch diameter tube 20, in this apparatus fashioned of a glass, high silicone glass or ceramic insulator (e.g., Vycor TM, Corning Glass Works, Troy N.Y.). Furnace 16 was 3 feet in length in the test apparatus but in practice a furnace may be omitted or may be up to 10 ft or longer. Within the furnace was packing material 22 such as glass wool (including silanized glass wool), polymeric fibers, ceramic-glass wool or metal wool being tested for coronal-catalytic properties. Packing material was contained by packing supports 24. The packing material was served by a power supply 26 leading through line 32 to the packing material with an outer electrode 28 and an inner electrode 30 leading to the power supply through line 34 equipped with resistor 36. The apparatus was also provided with a bypass line 38 having a valve 40 joining outlet sampling line 42 providing for inlet and outlet NO and $NO_x$ determinations at the same conditions, i.e. with the valve taking the place of the reactor.

Figure 3:
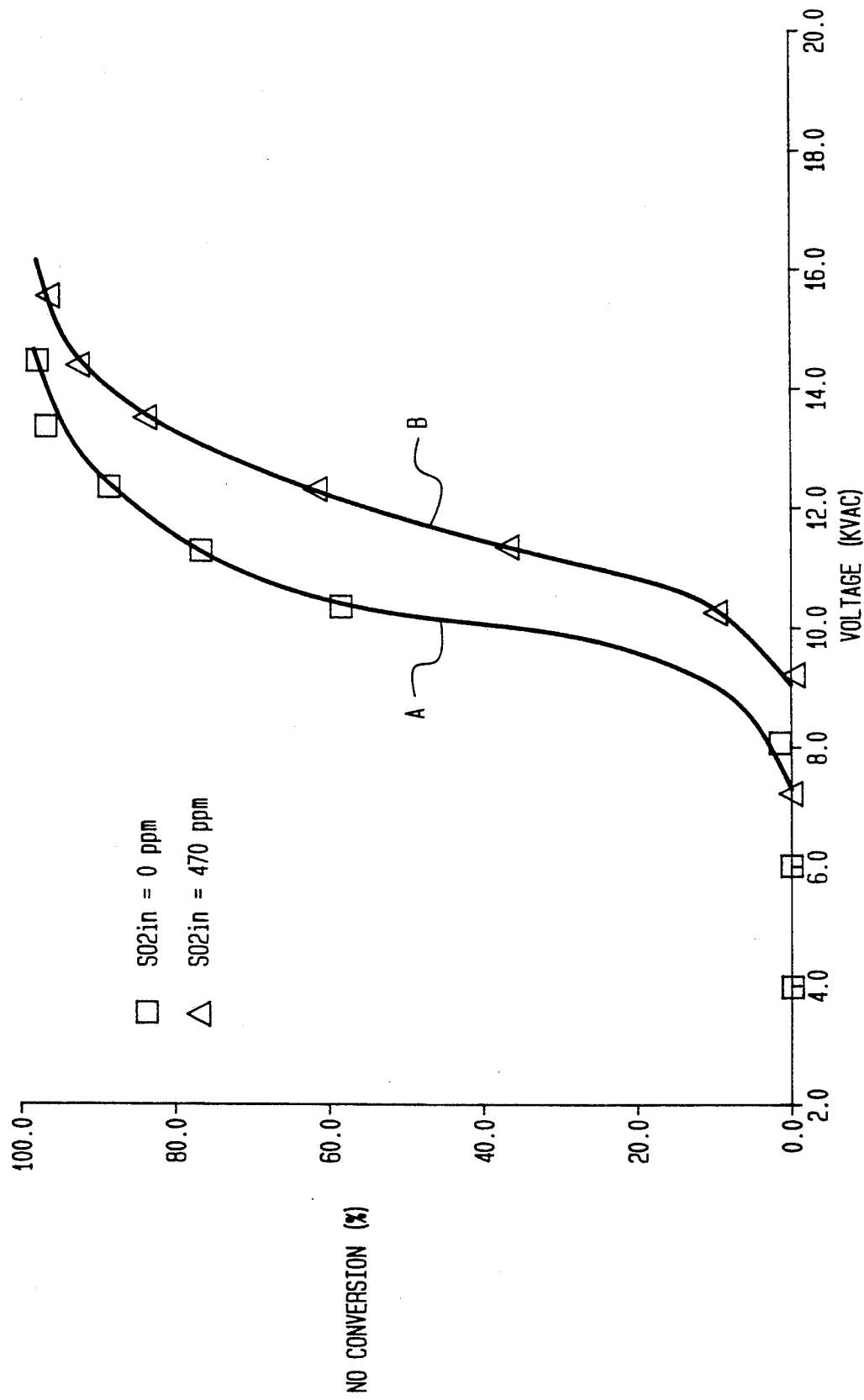
FIG. 3 is a graphic representation of sulfur tolerant coronal-catalyst compared to sulfur intolerant coronal-catalyst or sulfur intolerant catalyst in general.

FIG. 3 graphically represents the effect of $SO_2$ in inlet gas on NO conversion using glass wool catalyst packing. At 23° C. and NO input of 500 ppm, $O_2$ input 0.011% $H_2O$ input 0.15% with a residence time of 2.0 to 2.1 sec. Line A shows NO conversion without $SO_2$ present and line B with $SO_2$ at 470 ppm. NO conversion remains substantially 100%

Figure 4B:
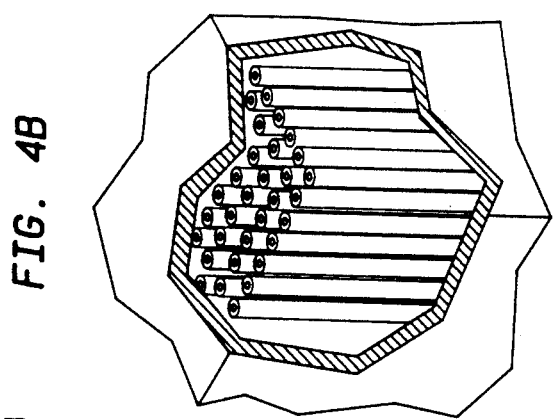
FIGS. 4a and 4b show details of a reactor tube of FIG. 4.
Figure 4:
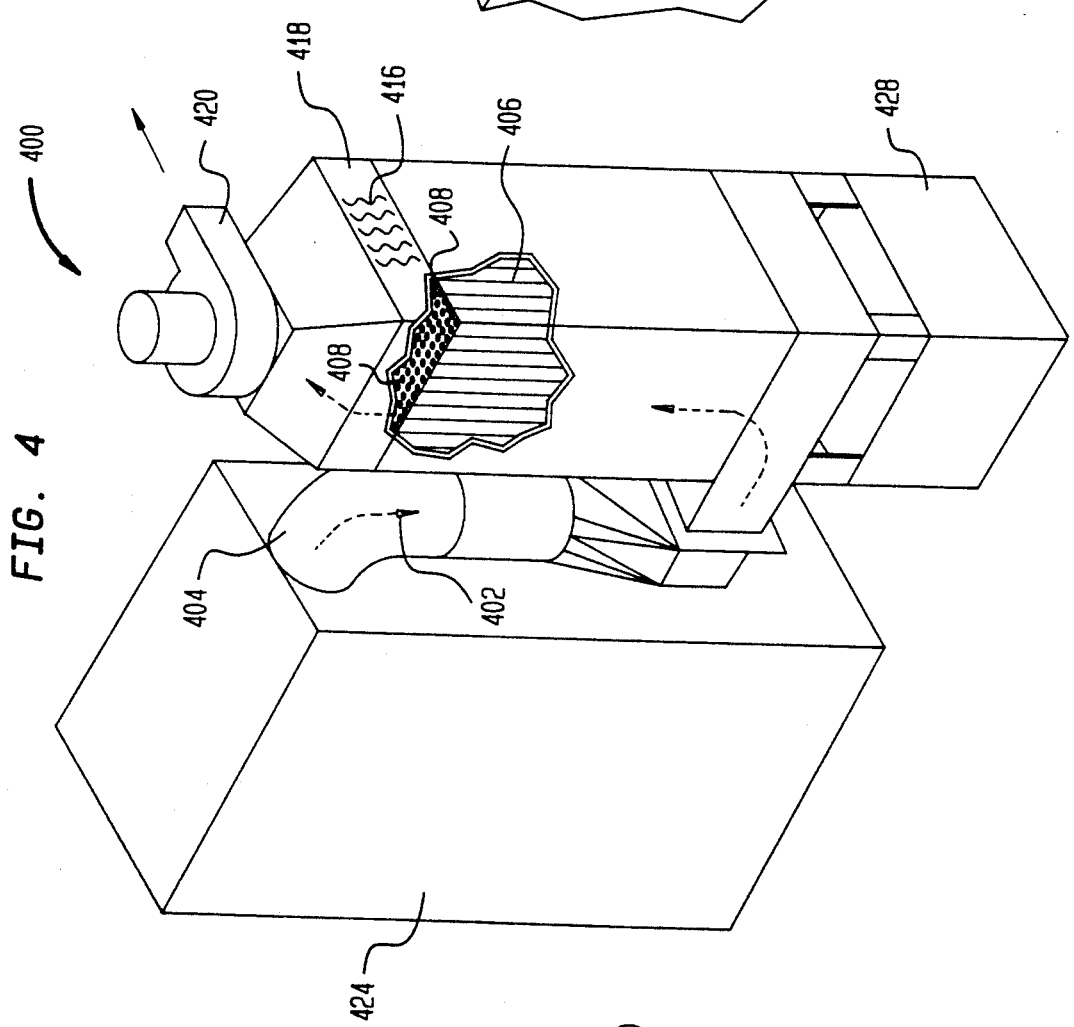
FIG. 4 is a schematic diagram of an coronal-catalytic column scrubber of the instant invention in industrial configuration.
Figure 4A:
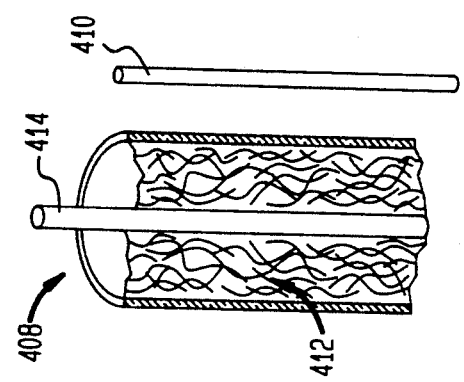

FIG. 4 shows a diagram of a commercial application in a residential setting for the invention. $NO_x$ reducing apparatus (400) has flue gas (402) enters the reactor (406) through plenum (404). The reactor as depicted is of 230 tubes 24 inches long in a 60° pitch. In the plenum the flue gas flow is directed to reactor tubes (408) being high dielectrics which are disposed, in this embodiment, in parallel as shown enlarged in FIG. 4b, (absent electrodes). Each tube (shown in detail in FIG. 4a) comprises an inner electrode (414) and an outer electrode (410) the tube being filled with coronal-catalyst (412) as packing material. Packing density from about 1 to 5 $kg/m^3$ was used though about 0.5 to about 150 $kg/^3$ is possible.

The flue gas traversing the interior of reactor tube (408) recombines as a single exit stream (416) in outlet plenum (418) and exits through outlet (420). The voltage across the electrodes is supplied at frequencies from about 60 Hz to about 30,000 Hz and in various wave forms. Voltage may be applied by energizing one or both electrodes. Energizing one electrode may be by means of a cold cathode transformer.

The complete system of FIG. 4 further comprises I.D. exhaust fan (422) and a power supply (428) powers fans and electric potential of the coronal-catalyst and a tuning circuit (426), connected to the outlet power supply and capable of minimizing the power requirement of the power supply. The source of $NO_x$ emission as depicted is a home heating system (424). In a typical residential application the overall system is about 5 to 6 feet in height and about one foot long on each side. Large capacity is easily accommodated by such design modification as including additional coronal-catalyst sections (406). Power consumption is about 150-300 watts in a residential furnace.

FIG. 6 illustrates the advantage to NO reduction in the presence of a reducing gas such as CO. The percentage of NO reduction is plotted against voltage with CO at 750 ppm and NO at 500 ppm. CO (+) as compared to no CO (■) discloses an increase in efficiency at a given voltage when a reducing gas is present in suitable quantity to increase no reduction.

The operational utility of the instant invention is clear from the following tables. Table 1(a) shows the reduction of NOin of 500 ppm with an $O_2$ content of 0.011% and a water content of 0.14% without coronal-catalyst, with a distance between electrodes 10.8 mm, and a residence time of 2.0 seconds. All percents are vol/vol unless otherwise noted. The percentage of conversion and reduction is seen to increase with voltage.

This invention will be better understood with reference to the following tables disclosing data gathered utilizing the test apparatus of FIG. 2.

Table 1(b) shows the reduction of NOin of 500 ppm with an $O_2$ content of 0.010% and a water content of 0.12%, using 15.0 gm ceramic-glass coronal-catalyst, with a distance between electrodes of 10.8 mm, and a residence time of 2.0 seconds. At voltages equivalent to (a) the efficience is seen as 2 to 3 times greater, and environment effective.

Table 1(c) shows the reduction of NOin of 500 ppm with an $O_2$ content of 0.011% and a water content of 0.10%, using 9.2 gm of cotton as packing, with a distance between electrodes of 10.8 mm, and a residence time of 2.0 seconds. At voltages equivalent to (a) the efficience is seen as about ½ that of the coronal-catalyst of 1(b).

Table 2(a) shows the reduction of NOin of 500 ppm with an $O_2$ content of 0.012% and a water content of 0.15%, using 7.68 gm glass coronal-catalyst, with a distance between electrodes of 10.8 mm, and a residence time of 2.1 seconds. At voltages from 6.1 to 16.04 kV. The efficiency is environment effective being over 90% at 16.04 kV.

Table 2(b) shows the reduction of NOin of 490 ppm with an $O_2$ content of 0.013% and a water content of 0.16%, using 55.0 gm of Linde Molecular Series 4A (Union Carbide, Danbury, Conn.), with a distance between electrodes of 10.8 mm, and a residence time of 2.0 seconds. At voltages equivalent to (a) the efficiency is seen as about 10% less as compared to the coronal-catalyst glass wool catalyst of Table 2(a).

Table 2(c) shows the reduction of NOin of 500 ppm with an $O_2$ content of 0.017% and a water content of 0.15%, using 7.71 gm of silanized glass wool coronal-catalyst thus chemically modified, with a distance between electrodes of 10.8 mm, and a residence time of 2.0 seconds. At voltages equivalent to (a) the efficiency is seen to be well over 99%, clearly environment effective.

Table 3(a) shows the reduction of NOin of 500 ppm with an $O_2$ content of 0.02% and a water content of 0.18%, using 7.78 gm of zirconium coated ceramic-glass coronal-catalyst, with a distance between electrodes of 10.8 mm, and a residence time of 2.0 seconds. At voltages upto about 16 kV the efficiency is seen as close to 99%, being clearly environment effective.

Table 3(b) shows the reduction of NOin of 500 ppm with an $O_2$ content of 0.012% and a water content of 0.22%, using 7.79 gm of glass wool coronal-catalyst, with a distance between electrodes of 10.8 mm, and a residence time of 2.0 seconds. At voltages upto about 16 kV efficiency is seen to be well over 99%, being clearly environment effective.

Table 4(a), (b) and (c), 5(a), (b) and (c) and (d) disclose more examples of glass wool as an highly effective coronal-catalyst.

EXPERIMENT 1

Using the above noted test apparatus metal wool (steel or stainless steel) was packed into the reactor. NO at about 500 ppm was introduced in a nitrogen stream into the reactor. The voltage was increased from zero to approximately 18,000 vac during the test. Measurable NO reduction began at a voltage of 4,000 volts. NO reduction increased uniformly and predictably with increasing voltages. A maximum reduction of about 60% occured at a voltage of 18,000 vac (the maximum possible from the experimental equipment). Stainless steel wool performed somewhat better than the steel wool but did not approach the efficiency of coronal-catalyst of the invention.

EXPERIMENT 2

Gold, known to be a highly catalytic material under these conditions, was tested for $NO_x$ reduction capability. The gold was plated on to stainless steel wool. Using the above noted test apparatus, the reactor then supplied a NO/nitrogen stream and the voltage increased from zero to about 18,000 vac. The gold system increased the NO conversion only slightly over unplated stainless steel wool.

EXPERIMENT 3

Using the above noted test apparatus, glass wool exhibited NO reduction in the test apparatus above a voltage of 6,000 vac. As the voltage was increased to above the hypercritical minimum the NO reduction went through an unpredictable "ignition" stage at such threshold after which the NO reduction in this configuration significantly out performed the metal wool systems. 100 percent reduction occured at a voltage of about 18,000 vac.

EXPERIMENT 4

Using the above noted test apparatus, Kaowool, above about 8,000 vac, the reduction of NO increased rapidly for increasing voltage, out performing the glass wool tests of Experiment 3. 100 percent conversion occured at a voltage of about 14,000 vac.

EXPERIMENT 5

The differences between Experiment 1 and 2 and Experiment 3 and 4 is the use of a coronal-catalyst high dielectric material as opposed to a conductive material. Since gas is also a dielectric, a test with no packing was run. After threshold voltage was reached, a maximum reduction of about 40 percent was observed.

TABLE 1

| 1a. | Empty Bed<br>NOin — 500 ppm<br>V (kv) | d = 10.8 mm<br>$O^2$in = 0.011%<br>% Conv | r = 2.05<br>$H_2O$in = 0.14%<br>% Red |
|---|---|---|---|
| | 8.16 | 0 | 0 |
| | 9.02 | 1.0 | 1.0 |
| | 10.04 | 1.0 | 1.0 |
| | 10.28 | 13.0 | 8.0 |
| | 14.02 | 29.0 | 18.0 |
| | 15.96 | 32.0 | 26.0 |
| 1b. | 15.0 gm ceramic-<br>glass wool<br>NOin — 500 ppm<br>V (kv) | d = 10.8 mm<br>$O^2$ — 010%<br>% Conv | r = 2.0<br>$H_2O$ = 0.12%<br>% Red |
| | 8.00 | 0 | 0 |
| | 10.04 | 8.0 | 6.0 |
| | 12.04 | 62.0 | 58.0 |
| | 13.40 | 92.0 | 89.6 |
| 1c. | 9.2 gm Cotton<br>NOin — 500 ppm<br>V (kv) | d = 10.8 mm<br>$O^2$ = .011%<br>% Conv | r = 2.0<br>$H_2O$ = 0.10%<br>% Red |
| | 8.12 | 0 | 0 |
| | 10.02 | 2.0 | 1.0 |
| | 12.04 | 38.0 | 32.0 |
| | 12.80 | 56.0 | 50.0 |
| | 13.0 | 62.0 | 56.0 |

Note that d = distance between electrodes and r = residence time in column in seconds.

TABLE 2

| 2a. | 7.68 g Glass wool<br>NOin — 500 ppm<br>V (kv) | d = 10.8 mm<br>$O^2$in — 0.012%<br>% Conv | r = 2.1<br>$H_2O$ = 0.15%<br>% Red |
|---|---|---|---|

TABLE 2-continued

|  |  |  |  |
|---|---|---|---|
|  | 6.10 | 0 | 0 |
|  | 7.94 | 1.0 | 1.0 |
|  | 9.04 | 4.0 | 4.0 |
|  | 10.00 | 33.0 | 19.0 |
|  | 10.04 | 71.0 | 63.0 |
|  | 14.06 | 87.6 | 85.6 |
|  | 16.04 | 96.0 | 95.2 |
| 2b. | 55.2 gm Linde Molecular Series 4A<br>NOin = 490 ppm<br>V (kv) | d = 10.8 mm<br>$O^2$in = .013%<br>% Conv | r = 2.0<br>$H_2O$ in = 0.16%<br>% Red |
|  | 6.04 | 0 | 0 |
|  | 8.02 | 2.0 | 0 |
|  | 10.02 | 34.7 | 34.7 |
|  | 12.00 | 72.4 | 70.4 |
|  | 14.02 | 80.6 | 76.6 |
|  | 16.12 | 81.6 | 79.6 |
| 2c. | 7.71 gm Silanized Glass Wool<br>NOin = 500 ppm<br>V (kv) | d = 10.8 mm<br>$O^2$in = .017%<br>% Conv. | r = 2.03<br>$H_2O$ = 15%<br>% Red |
|  | 6.20 | 0 | 0 |
|  | 8.04 0 | 0 | 0 |
|  | 10.16 | 10.0 | 8.0 |
|  | 12.12 | 60.0 | 54.0 |
|  | 14.08 | 98.9 | 98.3 |
|  | 15.02 | 99.9 | 99.8 |

TABLE 3

|  |  |  |  |
|---|---|---|---|
| 3a. | 7.78 gm Ziconium ceramic-glass wool<br>NOin — 500 ppm<br>V (kv) | d = 10.8<br>$O^{2p}$ = 0.02%<br>% Conv. | r = 2.0s<br>$H_2O$ = 0.18%<br>% Red |
|  | 8.04 | 0 | 0 |
|  | 10.10 | 3.0 | 3.0 |
|  | 12.02 | 50.0 | 44.0 |
|  | 14.02 | 85.0 | 82.0 |
|  | 16.09 | 99.2 | 98.4 |
| 3b. | 7.79 gm Glass Wool<br>NOin — 500 ppm<br>V (kv) | d = 10.8<br>$O^2$ = 0.012%<br>% Conv. | r = 2.20<br>$H_2O$ = 0.22%<br>% Red |
|  | 8.02 | 5.0 | 5.0 |
|  | 10.10 | 38.0 | 37.0 |
|  | 12.06 | 80.0 | 74.0 |
|  | 14.06 | 98.4 | 93.0 |
|  | 16.02 | 99.8 | 96.0 |

TABLE 4

|  |  |  |  |
|---|---|---|---|
| 4a. | 3.72 gm Glass Wool<br>NOin — 500 ppm<br>V (kv) | d = 10.8<br>$O^2$ 0.10%<br>% Conv. | r = 2.0<br>$H_2O$ = 0.15%<br>% Red |
|  | 6.12 | 0 | 0.0 |
|  | 8.02 | 3.0 | 2.0 |
|  | 10.00 | 13.0 | 10.0 |
|  | 12.06 | 48.0 | 46.0 |
|  | 14.06 | 71.2 | 67.0 |
|  | 16.06 | 82.0 | 67.0 |
| 4b. | 12.5 gm Glass Wool<br>NOin = 490 pp<br>V (kv) | d = 10.8 mm<br>$O^2$ = .012%<br>% Conv. | r = 2.0<br>$H_2O$ = 0.13%<br>% Red |
|  | 6.12 | 2.0 | 2.0 |
|  | 8.00 | 9.2 | 7.1 |
|  | 10.02 | 27.6 | 24.5 |
|  | 12.08 | 64.3 | 61.2 |
|  | 14.00 | 89.6 | 88.4 |
|  | 16.08 | 99.0 | 98.8 |
|  | 17.08 | 99.6 | 99.4 |
| 4c. | 24.6 gm Glass Wool<br>NOin — 500 ppm | d = 10.8 gm<br>$O^2$ = 0.013% | r = 2.0<br>$H_2O$ = 0.15% |

TABLE 4-continued

| V (kv) | % Conv. | % Red |
|---|---|---|
| 7.98 | 3.0 | 3.0 |
| 10.10 | 50.0 | 57.0 |
| 12.00 | 90.0 | 88.0 |
| 14.10 | 98.9 | 99.9 |

TABLE 5

|  |  |  |  |
|---|---|---|---|
| 5a. | 12.5 gm Glass Wool<br>NOin — 200 ppm<br>V (kv) | d = 10.8 mm<br>$O^2$ = 0.009%<br>% Conv. | r = 2.1<br>$H_2O$ = 0.14%<br>% Red |
|  | 6.02 | 9.5 | 7.5 |
|  | 8.10 | 20.5 | 17.5 |
|  | 10.08 | 53.0 | 49.5 |
|  | 10.04 | 94.0 | 93.0 |
|  | 14.00 | 99.8 | 99.8 |
| 5b. | 12.5 gm Glass Wool<br>NOin 695 ppm<br>V (kv) | d = 10.8 mm<br>$O^2$ = .011%<br>% Conv. | r = 2.0<br>$H_2O$ = 0.15%<br>% Red |
|  | 6.08 | 2.2 | 2.2 |
|  | 8.00 | 6.5 | 5.0 |
|  | 10.08 | 20.01 | 17.3 |
|  | 12.08 | 51.1 | 45.3 |
|  | 14.06 | 77.0 | 74.1 |
|  | 16.6 | 90.5 | 89.2 |
| 5c. | 24 gm Lg Glass Wool<br>NOin = 200 ppm<br>V (kv) | d = 10.8 pm<br>$O^2$ = 0.010%<br>% Conv. | r = 1.9<br>$H_2O$ = 0.15%<br>% Red |
|  | 6.10 | 0 | 0 |
|  | 8.10 | 2.5 | 2.5 |
|  | 10.08 | 14.0 | 12.5 |
|  | 12.02 | 99.0 | 98.4 |
|  | 12.56 | 99.8 | 99.8 |
| 5d. | 24.6 g Glass Wool<br>NOin 700 ppm<br>V (kv) | d = 10.8 mm<br>$O^2$in = 0.014%<br>% Conv. | r = 1.9<br>$H_2O$ = 0.15%<br>% Red |
|  | 6.12 | 0 | 0 |
|  | 8.08 | 0.7 | 0.7 |
|  | 10.02 | 10.0 | 8.6 |
|  | 12.00 | 58.6 | 54.3 |
|  | 14.02 | 92.1 | 90.0 |
|  | 15.82 | 99.9 | 99.6 |

We claim:

1. A method of environment effective reducing of $NO_x$ emission comprising the step of reactively exposing $NO_x$ to a sulfur tolerant coronal-catalyst said catalyst in a filamentous form and said exposing occurring at an electric power density of at least about 75 watts/meter$^3$.

2. The method of claim 1 wherein the coronal-catalyst is a high dielectric catalyst.

3. The method of claim 2 wherein the coronal-catalyst is glass wool.

4. The method of claim 2 wherein the coronal-catalyst is ceramic-glass wool.

5. A method of environmental effective reducing of $NO_x$ emission comprising the step of reactively exposing $NO_x$ to a sulfur tolerant coronal-catalyst said catalyst in a filamentous form wherein said coronal-catalyst is adapted and configured for hypercritical presentation to an $NO_x$ bearing gas stream wherein said exposing occurs at a minimum electric power density of at least about 75 watts/meter$^3$.

6. The method of claim 5 wherein the coronal-catalyst is a high dielectric catalyst.

7. The method of claim 6 wherein the coronal-catalyst is glass wool.

8. The method of claim 6 wherein the coronal-catalyst is ceramic-glass wool.

9. The method of claim 5 further comprising; providing an NO$_x$ environment effective reduction apparatus comprising a sulfur tolerant coronal-catalyst of glass wool or ceramic-glass wool;

disposing said coronal-catalyst in from one to a plurality of tubular members configured and adapted to receive a flow of NO$_x$ bearing gas;

maintaining said coronal-catalyst at an electrical power density of at least about 75 watts/meter$^3$;

said coronal-catalyst being present in amounts of from about 0.5 to about 150 kg/m$^3$;

applying to said one to a plurality of tubular members voltage from about 4000 to about 30,000 volts;

said voltage having a frequency of from 60 Hz to about 30,000 Hz;

maintaining residency of said flow of NO$_x$ bearing gas in said tubular members of from about 0.2 to about 5 seconds or more.

10. The method of claim 9 further comprising applying said voltage by means of a midpoint ground transformer or a cold cathode transformer.

11. The method of claim 5 further comprising adding suitable quantity of a reducing gas to increase no reduction.

* * * * *

UNITED STATES PATENT AND TRADEMARK OFFICE
CERTIFICATE OF CORRECTION

PATENT NO. : 5,147,516
DATED : September 15, 1992
INVENTOR(S) : Virendra K. Mathur et al It is certified that error appears in the above-indentified patent and that said Letters Patent is hereby corrected as shown below:

On the title page: Item [54] and Column 1, line 1, before "REDUCTION" cancel "NOX" and in place thereof insert --NOVEL $NO_x$--.

In the drawings:
FIG.6 has been omitted.

Column 1, line 1 of the title: cancel "NOX" and in place thereof insert --NOVEL $NO_x$--;
Column 1, line 34: after "oxides" cancel "int" and in place thereof insert --into--;
Column 3, between line 39 and line 40: insert new paragraph --FIG.6 is a graphic presentation of the effect of a reducing gas on NO reduction.--;
Column 5, line 55: after "e.g.," cancel "Vycor TM" and in place thereof insert --Vycor$^{tm}$--;

UNITED STATES PATENT AND TRADEMARK OFFICE
CERTIFICATE OF CORRECTION

PATENT NO. : 5,147,516
DATED : September 15, 1992
INVENTOR(S) : Virendra K. Mathur et al It is certified that error appears in the above-indentified patent and that said Letters Patent is hereby corrected as shown below:

Column 8, line 20: after "systems." and before "100" insert --Substantially--;

Column 8, line 28: after "Experiment 3." and before "100" insert --Substantially--; and Column 8, line 3 of TABLE 1, 1b: cancel "010%" and in place thereof insert --0.10%--.

In the claims:
Claim 1, line 4: after "in" delete "a";
Claim 5, line 4: after "in" delete "a"; and
Claim 9, line 1: after "comprising" delete ";" and in place thereof insert --:--.

Signed and Sealed this

Sixteenth Day of November, 1993

Attest:

BRUCE LEHMAN

Attesting Officer    Commissioner of Patents and Trademarks